Feb. 4, 1964

D. L. DIVELBISS 3,120,224

OVEN WITH REMOVABLE LINERS

Filed Sept. 19, 1961

INVENTOR.
DALTON L. DIVELBISS
BY
Oberlin, Maky & Donnelly
ATTORNEYS

Feb. 4, 1964  D. L. DIVELBISS  3,120,224
OVEN WITH REMOVABLE LINERS
Filed Sept. 19, 1961  3 Sheets-Sheet 2

INVENTOR.
DALTON L. DIVELBISS
BY Oberlin, Maky & Donnelly
ATTORNEYS

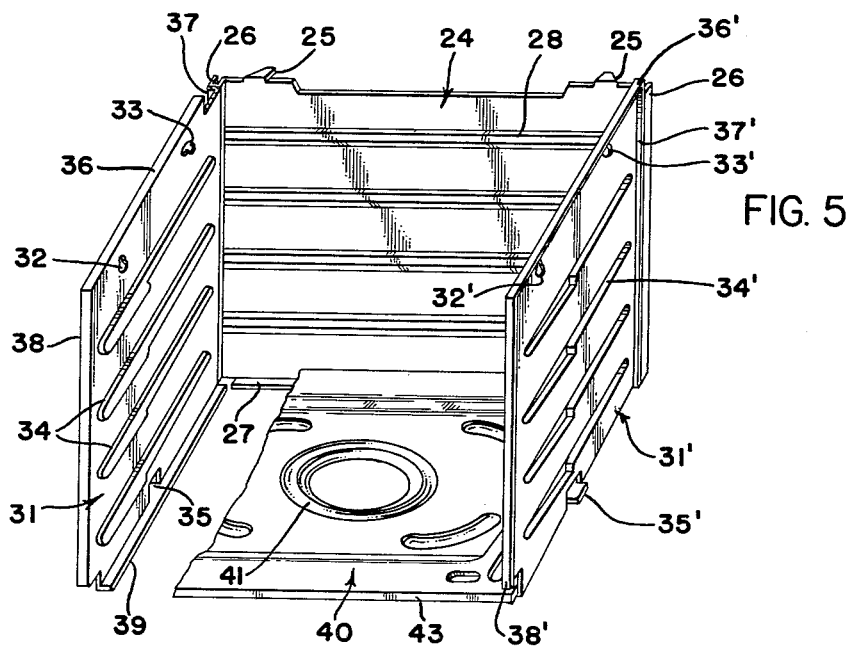
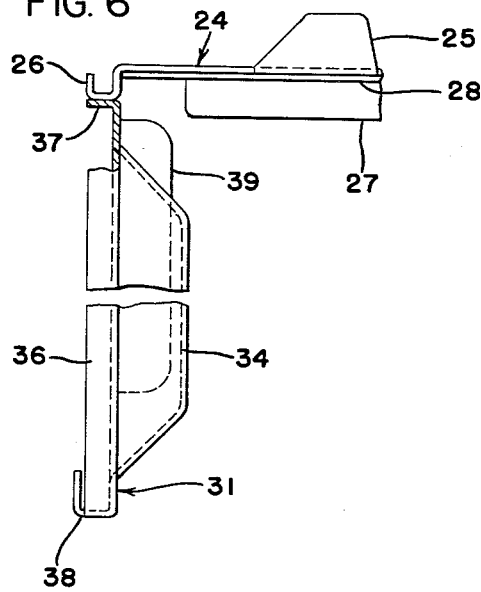
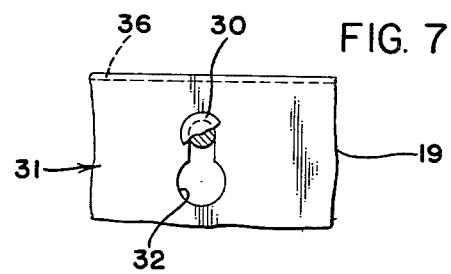
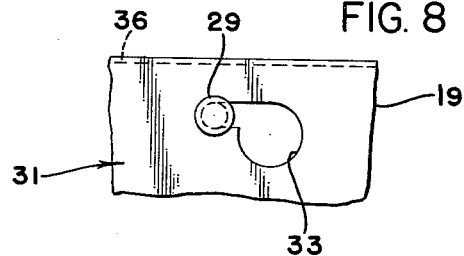

United States Patent Office 3,120,224
Patented Feb. 4, 1964

3,120,224
OVEN WITH REMOVABLE LINERS
Dalton L. Divelbiss, Lexington, Ohio, assignor to The Tappan Company, Mansfield, Ohio, a corporation of Ohio
Filed Sept. 19, 1961, Ser. No. 139,203
1 Claim. (Cl. 126—39)

This invention relates as indicated to an oven with removable lining means forming the inner wall surfaces thereof which are exposed to vapors and the other conditions, such as spatter, encountered in normal operation of an oven and responsible for dirtying of the same.

As contrasted to disposable lining means, the invention is more particularly concerned with oven liners of lasting or indefinitely usable character, with the removability of the same providing convenient detached cleaning.

It is a primary object to provide multi-component or sectionalized oven liner means in an assembly distinguished by the ease and convenience with which the components or sections can be assembled and taken apart. The assembly of the complete lining is accomplished within the oven, with the components being separately inserted and removed and also sized for ready handling and cleaning in an ordinary kitchen sink.

Another object is to provide such an assembly of liners having means for stabilizing the same as installed in the oven, for example, to preclude accidental dislodgment of the pieces as the result of manipulating trays or racks on supports therefor carried by the liners at the sides of the oven.

It is an additional object of the invention to provide an oven having removable separate back and side liners in assembly with a removable oven bottom wherein the latter assists in holding the liners in proper disposition within the oven.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

In said annexed drawings:

FIG. 5 is a front perspective of the liners in assembled relation;

FIG. 6 is a broken top view, on a further enlarged scale, of a rear corner portion of the FIG. 5 assembly;

FIG. 7 is an enlarged fragmented elevation of a first side liner attaching portion; and FIG. 8 is a similar elevation of a second side liner attaching portion.

Figure 1:
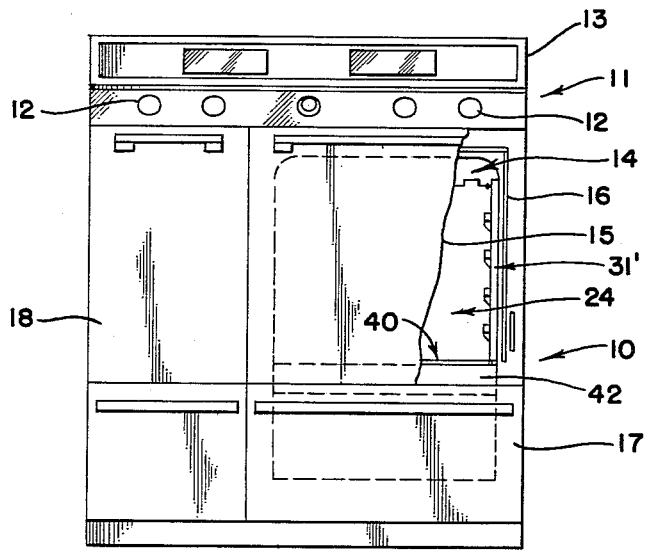
FIG. 1 is a front elevational view of a typical gas range provided with oven liners in accordance with the present invention.

Referring now to the drawings in detail, the gas range illustrated in FIG. 1 is conventional apart from the oven assembly and comprises a base or cabinet portion 10 and a cooking top 11 thereon. The latter contains a plurality of surface burners, not visible, with controls 12 therefor at the front and an upstanding backguard 13 at the rear. The oven 14 is located in the range cabinet, with a bottom hinged oven door 15, seals 16 on the frame about the oven opening, and a lower broiler drawer 17. At the left, there is in this embodiment a utility or storage compartment having a front door 18.

The present invention concerns the oven compartment proper, not including the lower broiler compartment, and the former is shown as formed by a one piece permanent liner having side walls 19 and 20 and an integral top wall 21. A back wall 22 is secured against the rear edges of such sides and top; this oven shell is, as indicated, permanently supported within the range chassis or cabinet 10 in spaced relation and, in accordance with conventional practice, thermal insulation which is not shown is applied around the outside of the shell.

The back wall 22 of the shell is provided with two horizontal slots 23 respectively in the upper corner portions of the same, and a back liner 24 is hung on the back shell wall by top edge hanger tabs 25 inserted through these slots. The thus removable back liner 24 is formed with forwardly closed and projecting vertical edge channels 26, a bottom horizontal flange 27 also projecting forwardly and, if desired, a plurality of stiffening ridges 28 (FIG. 5) in spaced relation over the area of the back.

The left side wall 19 of the oven shell, as viewed from the front, has a first bullet-nosed pin 29 projecting to the inside at the upper rear corner portion of the same and a second such pin 30 similarly mounted in the upper forward corner portion. As shown, these pins have enlarged, generally conical, heads. A left side oven liner 31 is hung on the two pins 29 and 30, with the pin 30 passing through an upwardly reduced aperture 32 in the liner and the pin 29 extending through a further aperture 33 having a forward reduced extension. As will be apparent, this liner 31 is hung by moving it against the shell side 19 to bring the heads of the pins 29 and 30 respectively through the enlarged portions of the apertures 32 and 33 and then adjusting it to locate the pin shanks in the reduced sections of such apertures. In this last illustrated condition, the rear pin engagement holds the liner in such region from shifting up and down, while the front pin engagement precludes in and out sliding of the liner.

Figure 2:
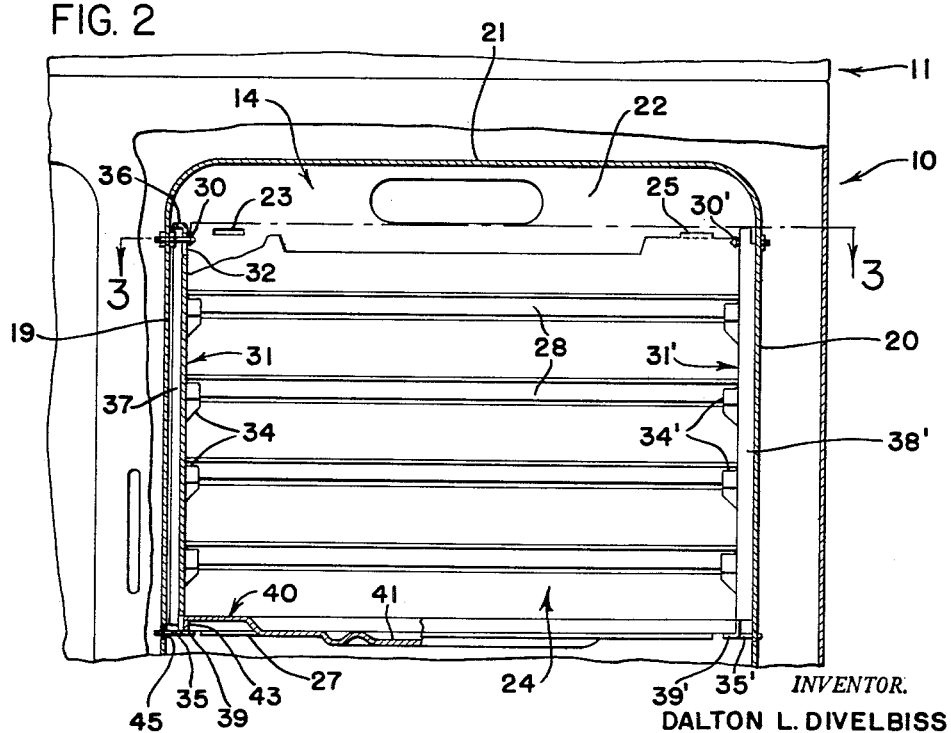
FIG. 2 is a fragmentary, sectional view of the front of the oven portion of such range on an enlarged scale and with the oven door removed and with a portion of the left side liner and of the oven bottom broken away.
Figure 3:
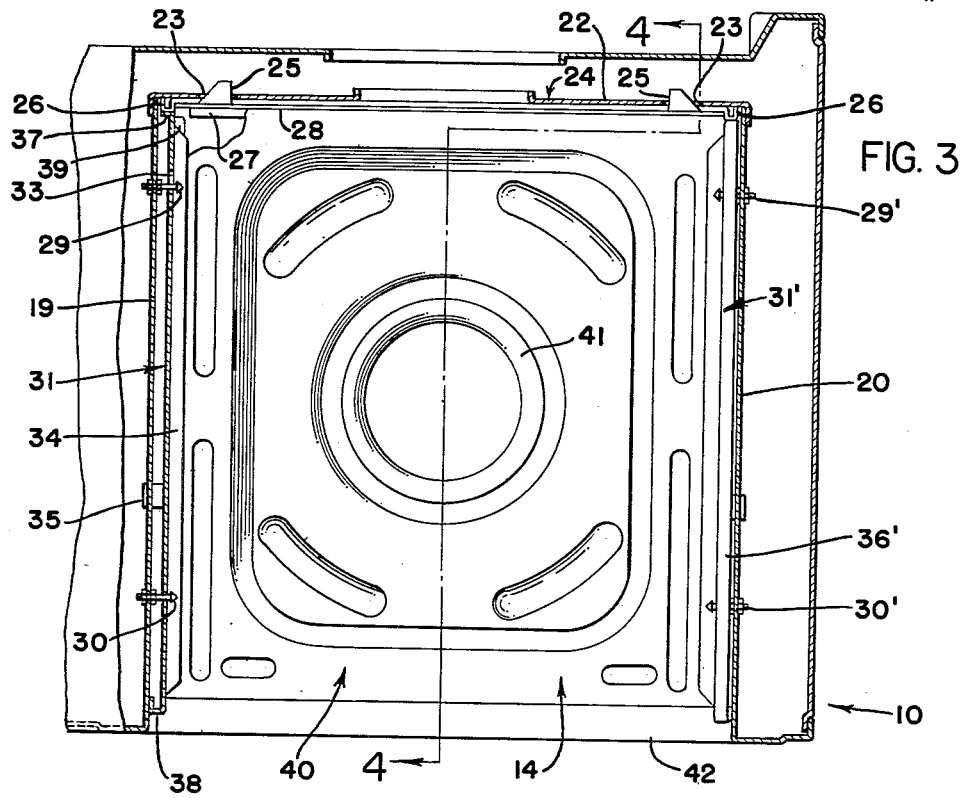
FIG. 3 is a horizontal section the plane of which is indicated approximately by the line 3—3 in FIG. 2, with certain parts broken away.

The liner 31 is formed with a series of integral inwardly projecting glides 34 for rack support, and it has a lower outer tab 35 forward of center which projects into a recess or slot 45 (FIG. 2) in the shell wall 19 for added restraint against lifting, for example, as the result of starting a loaded rack inwardly on one of the glides. The liner 31 has outwardly directed top and rear edge flanges 36 and 37, a front edge reversed flange 38 also directed outwardly, and a bottom flange 39 which projects to the inside. It will be noted that the rear flange 37 of this left side liner overlies the adjacent vertical edge channel 26 of the back liner 24 in the oven assembly.

A right side liner 31' of corresponding formation is hung on the right wall 20 of the shell on pins 29' and 30' as described in connection with the left liner 31. Accordingly, primed reference numerals have been applied to this right side liner and assembly for convenience and to show such correspondence.

Figure 4:
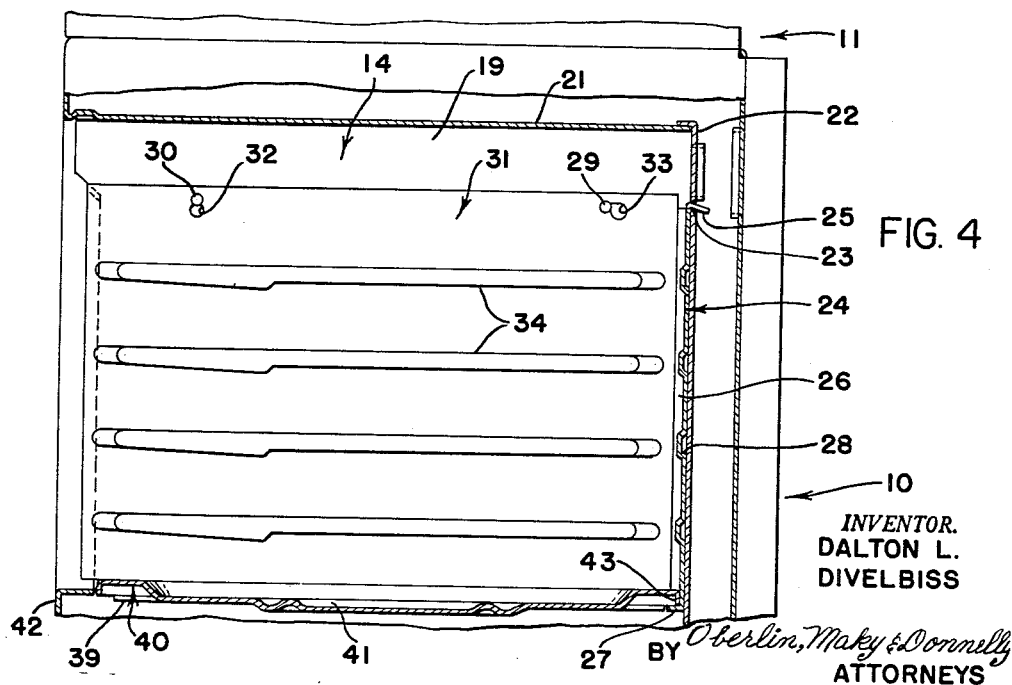
FIG. 4 is a vertical section taken on the line 4—4 in FIG. 3.

The oven is completed by a separate bottom 40, which may of course be embossed in customary manner as indicated at 41. With particular reference to FIG. 4, there is a horizontal channel plate 42 extending across the oven opening at the front and marking the division between the oven and the lower broiler compartment. This is conventional, and it will be understood that the burner, not shown, is mounted behind such plate. The oven bottom has a downturned flange 43 about its periphery, and it rests on the bottom flanges 27, 39 and 39' of the removable back and side liners, with its forward edge flange portion just inside and behind the top edge of the dividing channel 42.

The bottom 40 is of course rigid and fits fairly snugly in order to press the bottom edge portions of the back and side liners outwardly against the respective portions of the permanent shell which they overlie and thereby shield. The installation of the liners would be in the order described, that is, the back liner is first inserted, the two side liners are then added to overlie the vertical edges of the back liner as shown and described, and the bottom is then dropped in place; the order would of course be reversed for removal.

It should be apparent that such installation and removal can be very easily accomplished, with the bullet-noses of the side liner hanger pins helping to locate these liners in the placement of the same. The assembly within the oven fully protects the permanent structure from grease, vapor deposit and the like, and the several sections are all of a size that they can individually be conveniently handled and cleaned. These removable liners can obviously be made of relatively light gauge and coated with chrome for protection and enhanced cleanability.

Other modes of applying the principle of the invention may be employed, change being made as regards the details described, provided the features stated in the following claim or the equivalent of such be employed.

I, therefore, particularly point out and distinctly claim as my invention:

An oven comprising an outer shell having a rear wall and opposed side walls, a back oven liner removably hung on the rear wall of the shell at the inside of the same, a first side oven liner removably suspended on the interior of one side wall of the shell, a second side oven liner removably suspended on the interior of the other shell side wall, with said first and second side liners respectively overlying said back liner at rear edges of the former, the side and back liners being further provided with inwardly directed lower protrusions, said side liners being further provided with lower stabilizing tabs engaging opposed portions of the shell side walls to restrain the former against lifting from their proper assembled positions, and an oven bottom snugly fitting within the side and back liners and removably supported on such lower protrusions of the same, whereby said bottom serves releasably to lock the side and back liners in assembled condition.

References Cited in the file of this patent

UNITED STATES PATENTS

| | | |
|---|---|---|
| 1,126,220 | Jackson | Jan. 26, 1915 |
| 2,746,448 | Holmsten | May 22, 1956 |
| 2,797,680 | Nagel | July 2, 1957 |

FOREIGN PATENTS

| | | |
|---|---|---|
| 4,298 | Great Britain | Mar. 19, 1915 |
| 262,857 | Great Britain | Dec. 16, 1926 |
| 565,250 | Great Britain | Nov. 2, 1944 |
| 1,016,946 | France | Sept. 10, 1952 |